Nov. 25, 1958  O. C. DOSEN  2,861,483
METHOD AND APPARATUS FOR FINISHING MOLD GROOVES
Filed Jan. 12, 1953
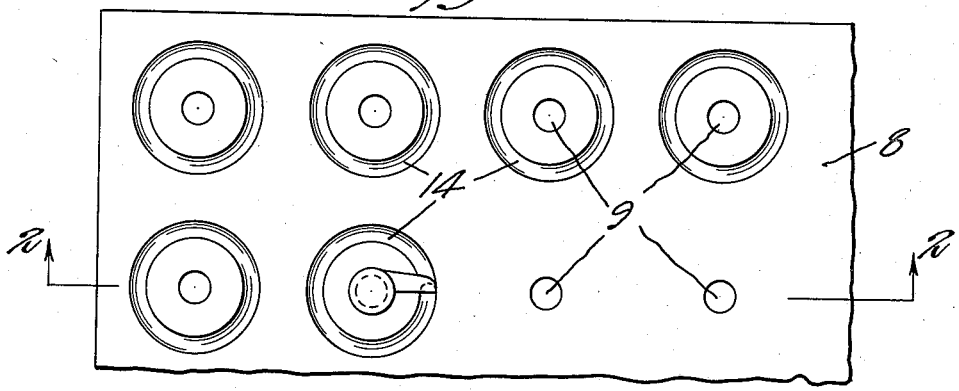
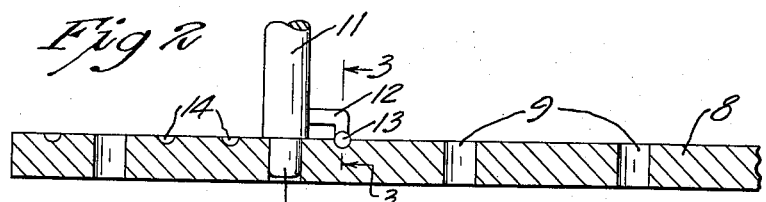
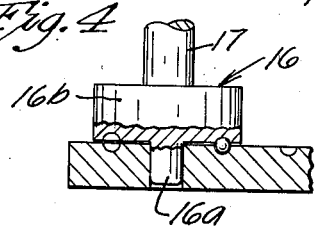
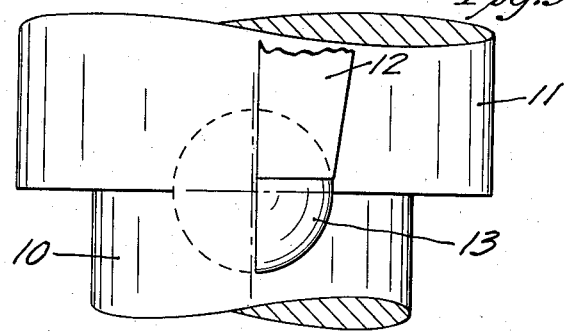
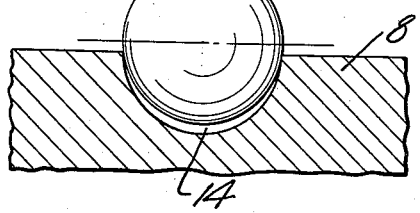
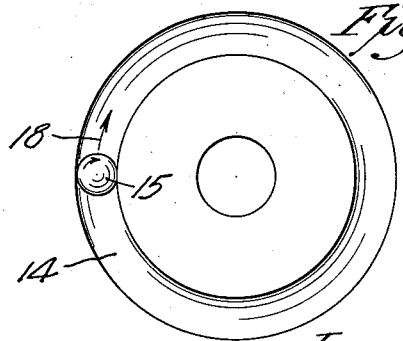
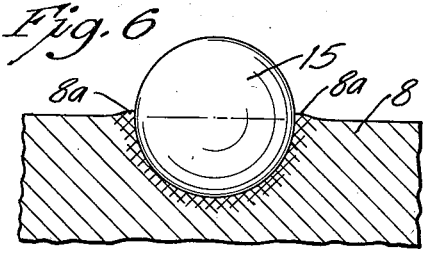
Inventor
Olaf C. Dosen
By
Williamson, Williamson, Schroeder, & Adams
Attorneys

United States Patent Office 2,861,483
Patented Nov. 25, 1958

2,861,483

METHOD AND APPARATUS FOR FINISHING MOLD GROOVES

Olaf C. Dosen, Hopkins, Minn.

Application January 12, 1953, Serial No. 330,653

2 Claims. (Cl. 76—107)

This invention relates to a method and apparatus for producing smooth and hard surfaced grooves for molding products from rubber and the like.

In molding of rubber products and the like, two cooperating sections are usually used, each consisting in one-half of the complete mold form. It has long been a problem to produce a mold section in which the grooved form has a smooth and hard surface. This has been a particular problem in the producing of "O-rings" which are resilient sealing rings for use on shafts and the like and, in most cases, are formed from rubber. Relatively close tolerances must be maintained in the size of the "O-rings" and therefore the size, surface smoothness, and precise shape of the mold in which the "O-rings" are formed are extremely critical.

It is an object of my present invention to provide a method and apparatus for accurately forming, and polishing and hardening, the surface of the mold groove.

It is another object to provide a method for initially producing a groove formation substantially semi-circular in cross section in a mold section and for subsequently polishing said groove to produce a smooth, work hardened surface therein and precisely forming said groove into a semi-circular, cross-sectional shape.

It is still another object to provide a method for producing in a mold section a groove formation precisely semi-circular in cross-sectional shape and having a highly polished, work hardened surface by initially forming a groove in a mold section and thereafter moving a spherical, hardened ball around said section while applying pressure thereto to polish and harden the surface of the section.

More specifically, it is an object to provide a tool for cutting a groove in a mold section consisting in a mounting member adapted to be mounted in a conventional cutter actuating mechanism and having a substantially hemispherical cutter element consisting in a segment of a hardened steel ball member.

These and other objects and advantages of this invention will more fully appear from the following description made in connection with the accompanying drawings wherein like reference characters refer to the same or similar parts throughout the several views, and in which:

Fig. 1 is a top plan view of one mold section with several of the groove formations formed therein;

Fig. 2 is a vertical sectional view thereof taken substantially along the line 2—2 of Fig. 1;

Fig. 3 is an enlarged fragmentary elevational view of the cutter assembly per se looking in the direction of the arrows indicated at 3—3 of Fig. 2 and showing in dotted lines the outline of the spherical ball from which the cutter element was formed with the center line of said ball being also shown;

Fig. 4 is an elevational view showing the polishing mechanism in operative position.

Fig. 5 is a vertical sectional view showing the polishing ball in operative position at the beginning of the polishing operation;

Fig. 6 is a similar view showing the ball in its operative position during the final stages of the polishing operation; and Fig. 7 is a top plan view of a mold formation with a polishing ball therein and provided with arrows showing the direction of movement and rotation of said ball in the groove formation.

In the manufacture of "O-rings" a mold assembly is used which is made up of two cooperating sections having cooperating groove formations adapted to be brought into precise registration respectively with one another. Such a section or plate is illustrated in Figs. 1 and 2 in a partially manufactured state and is designated by the numeral 8. The mold plate or section 8 has a plurality of spaced centering or pilot holes 9 formed therein, and said holes are adapted to receive a centering pin 10 formed at the bottom of a rotary drive shaft 11 which is connected with any suitable driving mechanism, such as a conventional drill press or the like, which not only rotates the same but presses the same downwardly toward the plate 8. For the cutting operation, a cutter mounting arm 12 is fixed in outstanding relation on shaft 11 and carries a cutter element 13 at the outer lower end thereof.

I have found that the initial cutting operation is extremely important to the ultimate formation of highly polished, accurately sized, work hardened mold grooves such as are illustrated at 14, best shown in Figs. 1 and 2. A hardened, substantially hemispherical steel segment forms a highly effective cutter element and the cutter 13 has been provided by grinding off slightly more than half of a hardened steel ball which has been previously mounted on the mounting arm 12 as by being brazed thereto. This ball segment will then cut a groove in the plate which will have a slightly smaller radius of curvature than the radius of a polishing ball of the same size as the ball from which the cutter was produced. This is best shown in Fig. 5 wherein the polishing ball, designated by the numeral 13, will be held out of engagement with the bottom of the groove during the initial stages of the polishing operation. Obviously, other methods of cutting a groove of the shape described could be used, but none has proved to be of comparable efficiency of manufacture to the one described herein. The size of the cutter compared with the size of the ball of which the same is a segment is best illustrated in Fig. 3 wherein the ball outline from which the cutter 13 is formed is shown by dotted lines and the center line of said ball is illustrated in slightly outwardly spaced relation from the cutting plane of the cutter element 13 which forms the curved cutting edge of said cutter.

After completion of the cutting operation, the surface of the groove must be finished in order to prevent the material being molded therein from sticking to the sides of the groove and to produce a smooth surfaced ring of extremely accurate inside and outside diameters. In order to efficiently accomplish this finishing operation, I have found that the use of a hardened steel ball of the precise diameter desired for the "O-ring" body produces surprising results. The ball 15 is placed in the circular groove 14, as shown in Fig. 5, and a rotary pressure applying head 16 is engaged against the top thereof. The head 16 has a depending pilot pin 16a adapted to be received in the pilot hole 9 in the center of the circular cavity or groove 14. An overlying head body 16b is fixed to a shaft 17 in any suitable manner and the centering pin 16a depends in fixed relation therebelow. A circular groove having the same diameter as the "O-rings" and the cavities 14 is formed in the underside of the head body 16b and the radius of this groove is the same as the radius of the polishing ball. However, the depth thereof is slightly less than the radius of the polishing ball. Obviously, said groove is concentric with the pilot pin 16a and surrounds the same in spaced relation thereto. The shaft 17 is connected in the form shown to the rotary member of a drill press in the same manner in which shaft 11 is connected therewith and downwardly directed pressure is exerted thereon while said head is being rotated. This downwardly exerted pressure and rotation of the head 16 causes the polishing ball 15 to move around the circular path of the groove cavity 14 as indicated by the arrow 18, shown in Fig. 7. Since the inside diameter of the cavity 14 is substantially less than the outside diameter thereof, movement of the ball 15 also produces rotation thereof in the cavity to produce an extremely efficient polishing and hardening action. The downwardly directed pressure on the ball as the same is moved around the cavity groove enlarges the radius of the upper portion of the groove by causing the metal to flow slightly as is shown in Fig. 6 and ultimately results in the ball engaging the entire inside wall surface of the cavity groove 14 to precisely produce a cavity groove of the desired cross-sectional radius and having a highly polished, work hardened surface.

The following steps set forth in detail my method for finishing mold cavity surfaces:

A circular cavity is initially produced which has a slightly smaller radius at the top thereof than is ultimately desired. A ball is placed in this cavity and has the precise radius desired to be produced in the cavity groove. The ball is moved around the cavity groove while downwardly directed pressure is applied thereto to cause the hardened ball to rotate during its travel around the groove and to produce a highly polished, work hardened surface within said groove.

By initially cutting the cavity groove with a ball segment having a size slightly less than a hemisphere of the ball to be used for polishing and final forming of the groove, a highly efficient and accurate cutting operation is provided which ultimately produces a cavity groove having an upper radius slightly less than the radius of the polishing ball and the ultimate desired radius.

It will be seen that I have provided extremely efficient, yet relatively simple, apparatus for producing and finishing the surface of mold cavities and have also produced an extremely efficient method for accomplishing the desired results. It should be noted that my method and apparatus produces in an inexpensive manner the desired highly polished and work hardened surface in the mold cavity. The pressing out of the metal adjacent the outer and inner diameters of the cavities, as indicated at 8a of Fig. 6, insures a positive seal between the cavities of two cooperating mold sections when the same are brought into registration, one against the other, and positively prevents leakage of the soft material forced into said cavity. These raised portions 8a are of course slightly exaggerated in Fig. 6 and serve to provide a mold which will maintain a positive seal between the sections thereof for surprisingly long periods of service and thus said raised portions materially increase the life of the mold. If the material flows out between the mold sections, "feathers" are produced which must be polished off of the "O-ring," thus materially increasing the cost of the manufacture thereof.

It will, of course, be understood that various changes made in the form, details, arrangement and proportions of the parts, particularly with respect to the method and apparatus for initially cutting the cavity grooves, without departing from the scope of this invention which, generally stated, consists in the matter shown and described herein and set forth in the appended claims.

What I claim is:

1. The method of cutting and finishing mold cavities consisting in initially cutting a cavity groove having a slightly smaller radius across the top than the ultimately desired radius, placing a ball of precisely the desired radius to be produced in said groove, moving said ball in said groove while applying downwardly directed pressure thereon and, while producing rotation of the ball in the groove, to slightly enlarge said groove and polish and harden the surface thereof.

2. The method of cutting and finishing mold cavities consisting in initially cutting by a cutter element made from a segment of a ball slightly less than a hemispherical section thereof to produce a groove in a mold plate having a radius across the top thereof slightly smaller than the ultimately desired radius of the groove, placing a ball of the same size as the ball from which said cutter segment was formed in said groove, said ball being of precisely the desired radius to be produced in the groove, moving said ball in the groove with a rolling action while applying downwardly directed pressure thereon to slightly enlarge the groove and polish and harden the surface thereof.

References Cited in the file of this patent

UNITED STATES PATENTS

| | | |
|---|---|---|
| 663,018 | Ford | Dec. 4, 1900 |
| 663,455 | Muehlberg | Dec. 11, 1900 |
| 713,000 | Ford | Nov. 4, 1902 |
| 784,041 | Ford | Mar. 7, 1905 |
| 921,739 | Rieske | May 18, 1909 |
| 2,164,569 | Christman | July 4, 1939 |
| 2,223,799 | Annen | Dec. 3, 1940 |
| 2,362,779 | Stevens | Nov. 14, 1944 |
| 2,686,391 | Porter et al. | Aug. 17, 1954 |